US012505699B2

(12) United States Patent
Subramanian et al.

(10) Patent No.: US 12,505,699 B2
(45) Date of Patent: Dec. 23, 2025

(54) METHOD AND SYSTEM TO PROVIDE REAL TIME INTERIOR ANALYTICS USING MACHINE LEARNING AND COMPUTER VISION

(71) Applicant: Sensormatic Electronics, LLC, Boca Raton, FL (US)

(72) Inventors: Gopi Subramanian, Boca Raton, FL (US); Joseph Celi, Boca Raton, FL (US); Michael C. Stewart, Deerfield Beach, FL (US); Jeffrey R. Rendlen, Chicago, IL (US); Michael Paolella, Lake Zurich, IL (US); Michelangelo Palella, Bartlett, IL (US); William Dubois, Orland Park, IL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

(21) Appl. No.: 17/018,992

(22) Filed: Sep. 11, 2020

(65) Prior Publication Data
US 2022/0083767 A1 Mar. 17, 2022

(51) Int. Cl.
*G06V 40/20* (2022.01)
*G06N 5/04* (2023.01)
(Continued)

(52) U.S. Cl.
CPC ............... *G06V 40/20* (2022.01); *G06N 5/04* (2013.01); *G06N 20/00* (2019.01); *G06Q 10/063112* (2013.01); *G06Q 10/06393* (2013.01); *G06Q 10/087* (2013.01); *G06Q 10/10* (2013.01); *G06Q 30/0201* (2013.01); *G06Q 30/0281* (2013.01);
(Continued)

(58) Field of Classification Search
CPC ........... G06K 9/00335; G06K 9/00718; G06K 9/00771; G06K 2009/00738; H04N 5/23299; H04N 5/23203; H04N 7/181; G06N 20/00; G06N 5/04;
(Continued)

(56) References Cited

U.S. PATENT DOCUMENTS 11,715,278 B2 * 8/2023 Subramanian ........ G06F 18/214
382/199
2013/0002868 A1 * 1/2013 Yoshimitsu ............ H04N 7/181
348/143

(Continued)

OTHER PUBLICATIONS

International Search Report and Written Opinion for International Patent Application No. PCT/US2021/049228, mailed Jan. 4, 2022 (32 pages).

*Primary Examiner* — Daniel T Tekle
(74) *Attorney, Agent, or Firm* — ArentFox Schiff LLP

(57) ABSTRACT

A system may be configured to generate real-time analytics using machine learning and computer vision. In some aspects, the system may receive a storage structure video frame and an interaction video frame, determine a storage structure inference based on the storage structure video frame, and determine an interaction inference based on the interaction video frame. Further, the system may determine that the storage structure inference and the interaction inference correspond to a common time period and common location, and generate analytics information based on the storage structure inference and the interaction inference.

22 Claims, 8 Drawing Sheets

(51) Int. Cl.
*G06N 20/00* (2019.01)
*G06Q 10/0631* (2023.01)
*G06Q 10/0639* (2023.01)
*G06Q 10/087* (2023.01)
*G06Q 10/10* (2023.01)
*G06Q 30/02* (2023.01)
*G06Q 30/0201* (2023.01)
*G06V 20/40* (2022.01)
*G06V 20/52* (2022.01)
*H04N 7/18* (2006.01)
*H04N 23/66* (2023.01)
*H04N 23/695* (2023.01)

(52) U.S. Cl.
CPC .............. *G06V 20/41* (2022.01); *G06V 20/52* (2022.01); *H04N 7/181* (2013.01); *H04N 23/66* (2023.01); *H04N 23/695* (2023.01); *G06V 20/44* (2022.01)

(58) Field of Classification Search
CPC ..... G06Q 10/063112; G06Q 10/06393; G06Q 10/087; G06Q 10/10; G06Q 30/0201; G06Q 30/0281

USPC .......................................................... 348/77
See application file for complete search history.

(56) References Cited

U.S. PATENT DOCUMENTS

| | | | |
|---|---|---|---|
| 2013/0039543 A1* | 2/2013 | Fuhr ..................... G08B 27/00 | 382/103 |
| 2013/0265423 A1* | 10/2013 | Bernal ............... G06Q 30/0284 | 348/148 |
| 2014/0294231 A1* | 10/2014 | Datta ..................... G06T 7/292 | 382/103 |
| 2017/0116714 A1* | 4/2017 | Matsushita ............ H04N 23/88 | |
| 2017/0255899 A1* | 9/2017 | Taira ..................... G06K 7/1413 | |
| 2017/0262438 A1* | 9/2017 | Raichelgauz ........... G06F 16/48 | |
| 2018/0130078 A1* | 5/2018 | Jones ................. G06Q 30/0639 | |
| 2020/0334620 A1* | 10/2020 | Yanagi ..................... G06T 7/00 | |
| 2020/0380226 A1* | 12/2020 | Rodriguez ........... G06V 10/147 | |
| 2021/0042509 A1* | 2/2021 | Valiulla .................. G06N 20/00 | |
| 2022/0044056 A1* | 2/2022 | Liu .................. G06V 10/462 | |
| 2022/0101550 A1* | 3/2022 | Kansai ..................... G06T 7/70 | |

* cited by examiner

METHOD AND SYSTEM TO PROVIDE REAL TIME INTERIOR ANALYTICS USING MACHINE LEARNING AND COMPUTER VISION

CROSS REFERENCE TO RELATED APPLICATIONS

This application is related to co-pending U.S. patent application Ser. No. 17/019,010, by Subramanian et al., entitled "Real time Tracking of Shelf Activity Supporting Dynamic Shelf Size, Configuration and Item Containment," filed on Sep. 11, 2020, which is hereby incorporated by reference in its entirety.

BACKGROUND

The present disclosure relates generally to real-time analytics, and more particularly, to methods and systems for generating and presenting real-time analytics using machine learning (ML) and computer vision.

Some retail operations may employ video camera feeds to gather information about customer activity. For example, the video camera feeds may be used to monitor a retail location as a means of loss prevention (e.g., preventing shoplifting), or implement access control to areas within the retail location. Additionally, or alternatively, the video camera feeds may be used to determine customer habits, e.g., traffic flow through the retail location. Current video-feed-based systems operate separately from one another, and/or are configured to perform narrow analyses directed to a single context. As such, the video-feed-based systems fail to perform comprehensive analyses in real-time that leverage various types of information gleaned from the collected video data, thereby squandering opportunities to enhance the customer experience, optimize storage structure usage, and/or maximize profits.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The present disclosure provides systems, apparatuses, and methods for generating and presenting real-time interior analytics using ML and computer vision. In an aspect, a method for generating real-time interior analytics using machine learning and computer vision comprises receiving a storage structure video frame from a first video capture device positioned to capture display activity at a storage structure within a monitored area, receiving an interaction video frame from a second video capture device positioned to capture interaction activity of customers, determining a storage structure inference based on the storage structure video frame, determining an interaction inference based on the interaction video frame, determining that the storage structure inference and the interaction inference correspond to a common time period and common location, and generating analytics information based on the storage structure inference and the interaction inference.

In some implementations, the method may further comprise identifying an employee associated with the storage structure and sending a notification to an employee device associated with the employee, the notification including an instruction corresponding to the analytics information. In some implementations, the method may further comprise identifying a third video capture device associated with the storage structure and sending a notification to the third video capture device, the notification instructing the third video capture to reposition to capture a potential event at the storage structure.

In some implementations, determining the storage structure inference may comprise determining an available capacity of a portion of the storage structure, or identifying a sweep event or a restocking requirement at the storage structure. In some other implementations, determining the interaction inference may comprise determining at least one of a wait time or an engagement time of a customer in a zone of the monitored area, determining a sentiment of a customer in a zone of the monitored area, or determining a demographic attribute of a customer in a zone of the monitored area.

In some implementations, generating the analytics information may comprise generating an employee assignment recommendation recommending a type of employee staff a location associated with the storage structure, generating a loss prevention alert indicating possible unauthorized activity at the location associated with the storage structure, generating a report including one or more key performance indicators associated with activity within the monitored area, or generating a schedule for stocking the storage structure.

The present disclosure includes a system having devices, components, and modules corresponding to the steps of the described methods, and a computer-readable medium (e.g., a non-transitory computer-readable medium) having instructions executable by a processor to perform the described methods.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
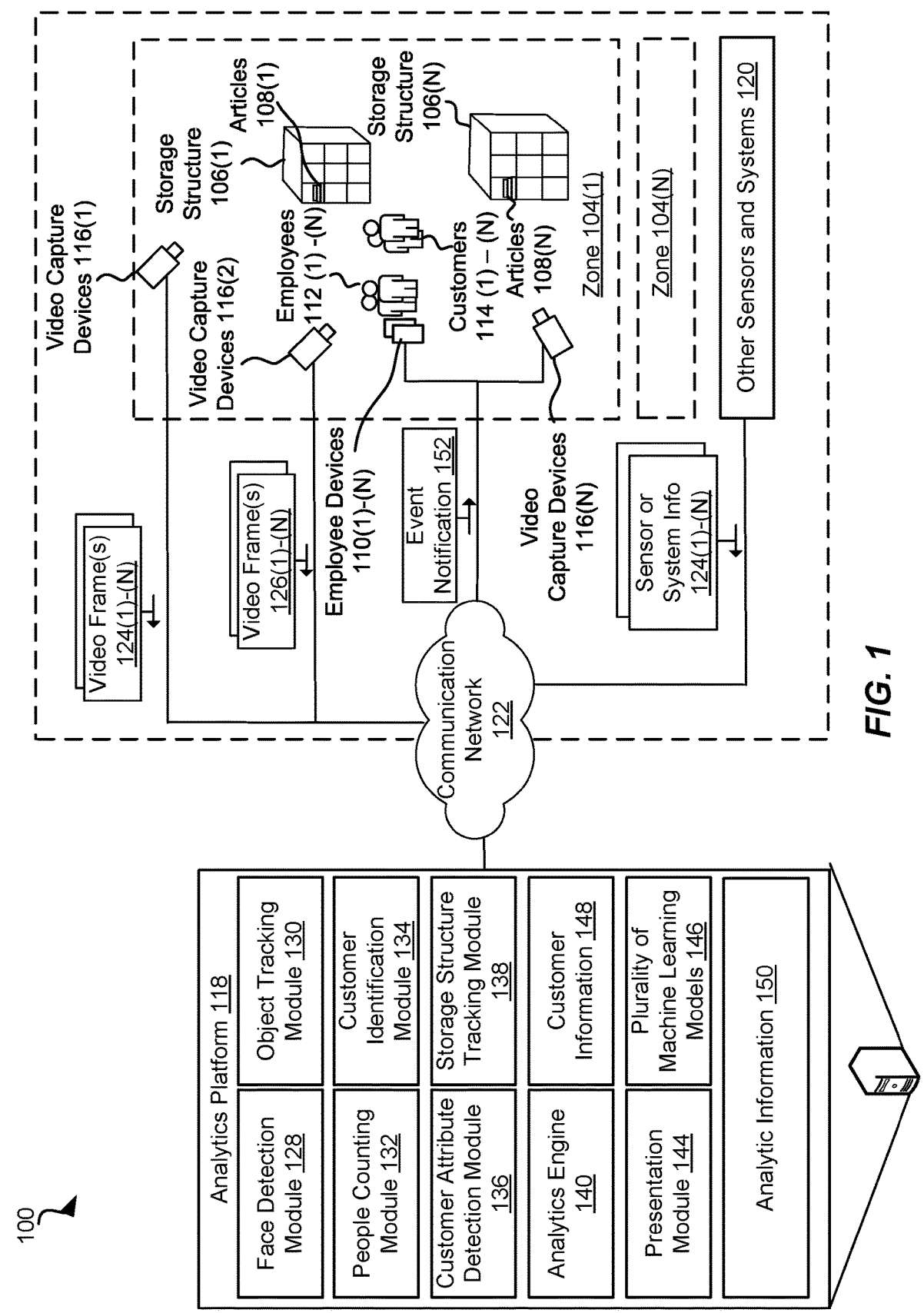
FIG. 1 is a block diagram of a system for generating and presenting real-time interior analytics using ML and computer vision, according to some implementations.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Implementations of the present disclosure provides systems, methods, and apparatuses that generate and present real-time interior analytics using ML and computer vision. These systems, methods, and apparatuses will be described in the following detailed description and illustrated in the accompanying drawings by various modules, blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented as a "processing system" that includes one or more processors. Examples of processors include microprocessors, microcontrollers, graphics processing units (GPUs), central processing units (CPUs), and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

In some implementations, one problem solved by the present solution is generating real-time interior analytics from video feed information collected in heterogeneous contexts. For example, this present disclosure describes systems and methods for generating real-time interior analytics from video feed information collected from video feed contexts configured to monitor customer entry and exit, monitor shelf activity, prevent article theft, identify customer sentiment, track customer traffic flow, respectively. As used herein, in some aspects, "real-time" may refer to receiving a live video feed of customer activity, and determining the interior analytics upon receipt of the live feed. The present solution provides comprehensive analyses in such scenarios by leveraging inferential information from the various video feed contexts to generate the interior analytics.

Referring to FIG. 1, in one non-limiting aspect, a system 100 is configured to generate and present real-time interior analytics using ML and computer vision within a controlled area 102 based on video feed data. For example, system 100 is configured to capture video feed data, determine inference information from the video feed data in different contexts, and generate analytics information (i.e., interior analytics) in real-time based on the inference information from the different contexts.

As illustrated in FIG. 1, the system 100 may provide real-time interior analytics using machine learning and computer vision within the controlled area 102. In some aspects, the controlled area 102 may be divided into a plurality of zones 104(1)-(N). Some examples of a zone 104 include an aisle, collection of aisles, department, area, floor, or region within a physical space and/or immediately outside of the physical space. Further, the controlled area 102 may include a plurality of storage structures 106(1)-(N) displaying a plurality of articles 108(1)-(N). Some examples of a storage structure 106 include shelves, tables, display cases, showcases, etc. In some aspects, an article 108 may be presented within a zone 104 of the controlled area 102 based upon one or more attributes of the article 108, or one or more attributes of an intended audience or customer of the article 108. For example, the zone 104(1) may be associated with articles 108 for children. As such, the storage structures 106 within the zone 104(1) may contain articles 108 for children.

As illustrated in FIG. 1, the system 100 may include a plurality of employee devices 110(1)-(N) associated with a plurality of employees 112(1)-(N) employed within the controlled area 102. Some examples of the employee devices 110(1)-(N) include point-of-sale (POS) terminals, wearable devices (e.g., optical head-mounted display, smartwatch, etc.), smart phones and/or mobile devices, laptop and netbook computing devices, tablet computing devices, digital media devices and eBook readers, etc. Further, the employees 112(1)-(N) may assist and/or monitor a plurality of customers 114(1)-(N) shopping within the controlled area 102. For example, the employees 112(1)-(N) may recommend particular articles 108 to the customers 114(1)-(N) and facilitate purchase activity by the customers 114(1)-(N) of the articles 108(1)-(N) via the employee devices 110(1)-(N).

In addition, the system 100 may include one or more video capture devices 116(1)-(N) and an analytics platform 118. The video capture devices 116(1)-(N) may be located throughout the controlled area 102. Each of the video capture devices 116(1)-(N) may provide a video feed of one or more of the zones 104(1)-(N). For example, the video capture devices 116(1)-(N) may be configured to capture video frames within the controlled area 102 and send the video frames to the analytics platform 118.

In some aspects, a first group of the video capture devices 116(1)-(N) may be positioned to monitor the storage structures 106(1)-(N). Further, a second group of the video capture devices 116(1)-(N) may be positioned to monitor interactions between the employees 112(1)-(N) and the customers 114(1)-(N) and the customers 114(1)-(N) and the storage structures 106(1)-(N). In addition, a third group of the video capture devices 116(1)-(N) may be dynamically repositioned and/or oriented to capture particular views within the controlled area 102 or immediately outside of the controlled area 102. For example, each of the third group of video capture devices 116(1)-(N) may be may be mounted on a gimbal that allows rotation and panning of the respective video capture device 116.

As illustrated in FIG. 1, the system 100 may include one or more other sensors and systems 120. Some examples of the one or more other sensors or systems 120 may include a people counting system, a detection system, temperature sensors, etc. In some aspects, the people counting system may employ one or more lasers or time of flight sensors to maintain a count of the customers 114(1)-(N) that have entered and exited the controlled area 102. In some aspects, the detection system may create a surveillance zone at an exit, a private area (e.g., fitting room, bathroom, etc.), or a checkout area of the controlled area 102. Further, the detection system may transmit exciter signals that cause security tags affixed to the articles 108(1)-(N) to produce detectable responses if an unauthorized attempt is made to remove one or more articles 108 from the controlled area 102.

Further, the system 100 may include a communication network 122. Further, the employee devices 110(1)-(N), the video capture devices 116(1)-(N), the analytics platform 118, and the other sensors and systems 120 may communicate via the communication network 122. For example, the first group of the video capture video devices 116(1)-(N) may send storage structure video frames 124(1)-(N) to the analytics platform 118 via the communication network 122, and the second group of the video capture devices 116(1)-(N) may send interaction video frames 126(1)-(N) to the analytics platform 118 via the communication network 122. In some aspects, a video capture device 116 may belong to the first and second groups of video capture devices 116(1)-(N), and send storage structure video frames 124 and the interaction video frames 126 to the analytics platform 118. Further, the other sensors or systems 120 may be configured to send sensor or system information 127 to the analytics platform 118 via the communication network 122. In some aspects, the sensor or system information 127 may be used to compliment the storage structure video frames 124(1)-(N) and interaction video frames 126(1)-(N). For example, the sensors or systems 120 may send sensor or system information 127 indicating a current count of entries and exits to the controlled area 102, or notifications of detectable responses received in response to unauthorized attempts to remove articles 108 from the controlled area 102. In some implementations, the communication network 122 may include one or more of a wired and/or wireless private network, personal area network, local area network, wide area network, or the Internet.

The analytics platform 118 may be configured to generate key performance indicators (KPIs) data, real-time prescriptive insights and predictive analytics based on the real-time video feeds received from the video capture devices 116. As illustrated in FIG. 1, the analytics platform 118 may include a face detection module 128, an object tracking module 130, a people counting module 132, a customer identification module 134, a customer attribute detection module 136, storage structure tracking module 138, an analytics engine 140, a presentation module 144, a plurality of machine learning models 146, and customer information 148. As described in detail herein, the face detection module 128, the object tracking module 130, the people counting module 132, the customer identification module 134, the customer attribute detection module 136, and the storage structure tracking module 138 may employ the machine learning models 146 or computer vision techniques to determine real-time inferences based on the storage structure video frames 124(1)-(N) and the interaction video frames 126(1)-(N). Further, the analytics engine 140 may generate KPI data, real-time prescriptive insights, and predictive analytics based on the real-time inferences.

The face detection module 128 may be configured to detect faces in the interaction video frames 126(1)-(N) received from the video capture devices 116(1)-(N), and provide inference information including the detected faces to the analytics engine 140. For instance, the face detection module 128 may be configured to identify a face within the interaction video frames 126(1) based at least in part on machine learning models 146 configured to identify facial landmarks within a video frame. In addition, the face detection module 128 may send inference information identifying the face to the analytics engine 140.

The object tracking module 130 may be configured to track objects between the interaction video frames 126(1)-(N), and provide inference information including the detected movement to the analytics engine 140. For example, the object tracking module 130 may be configured to generate tracking information indicating movement of a person (i.e., an employee 112 or a customer 114) between the interaction video frames 126(1)-(N). In addition, the object tracking module 130 may be configured to distinguish between employees 112(1)-(N) and customers 114(1)-(N). For instance, the object tracking module 130 may employ a machine learning model 146 (e.g., a deep neural network model) trained to distinguish between employees 112(1)-(N) and customers 114(1)-(N) based on attributes identified within the interaction video frames 126(1)-(N). In some aspects, the object tracking module 130 may determine a bounding box for the person and track the movement of the bounding box between successive interaction video frames 126. Further, the object tracking module 130 may send inference information including the tracked movement to the analytics engine 140. In some examples, the object tacking module 130 may generate the bounding box based at least in part on a face detected by the face detection module 128. In some aspects, the object tracking module 130 may employ machine learning techniques or pattern recognition techniques to generate the bounding box corresponding to the employees 112(1)-(N) and customers 114(1)-(N) within the controlled area 102.

Further, the object tracking module 130 may determine path information for the employees 112(1)-(N) and customers 114(1)-(N) within the controlled area 102 based at least in part on the tracking information, and provide inference information including the path information to the analytics engine 140. As an example, the object tracking module 130 may generate path information indicating the journey of the customer 114(1) throughout the controlled area 102 based upon the movement of the customer 114(1) between successive interaction video frames 126. In addition, the object tracking module 130 may be able to determine a wait time indicating the amount of time a customer 114 has spent in a particular area without interacting with an employee 112, and/or an engagement time indicating the amount of time a customer 114 has spent interacting with an employee 112. Further, the object tracking module 130 may be configured to generate a journey representation indicating the journey of a customer 114 through the controlled area 102 with information indicating the duration of the journey of the customer 114 within the controlled area 102, and the amount of time the customer 114 spent at different areas within the controlled area 102. Additionally, the object tracking module 130 may provide inference information including the journey representation to the analytics engine 140.

In some aspects, the object tracking module 130 may determine the wait time and the engagement time based at least in part on bounding boxes. For instance, the object tracking module 130 may determine a first bounding box corresponding to the customer 114(1) and a second bounding box corresponding to the employee 112(1). In addition, the object tracking module 130 may monitor the distance between the first bounding box and the second bounding box. In some aspects, when the distance between the first bounding box and the second bounding box as determined by the object tracking module 130 is less than a threshold, the object tracking module 130 may determine that the customer 114(1) is engaged with the employee 112(1), otherwise the object tracking module 130 may determine that the customer 114(1) is not currently being assisted within the controlled area 102. In addition, the object tracking module 130 may further rely on body language and gaze to determine whether the customer 114(1) is being assisted. As used herein, in some aspects, "body language" may refer to a nonverbal communication in which physical behaviors, as opposed to words, are used to express or convey information. Some examples of body language may include facial expressions, body posture, gestures, eye movement, touch and the use of space.

Further, the object tracking module 130 may be configured to determine path information for the employees 112(1)-(N) and customers 114(1)-(N) and determine the wait time and/or the engagement time of customers 114(1)-(N) based at least in part on machine learning models 146 configured to generate and track bounding boxes.

The people counting module 132 may determine the amount of customers 114(1)-(N) that enter and exit the controlled area 102 based on video feed information (e.g., the storage structure video frames 124(1)-(N) and the interaction video frames 126(1)-(N)) received from the video capture devices 116(1)-(N) and provide the amount of customers 114 entering and exiting the controlled area 102 to the analytics engine 140. In particular, the one or more of the video capture devices 116(1)-(N) may be positioned to capture activity by entry ways and exits of the controlled area 102. Further, in some aspects, the people counting module 132 may identify customers in the video feed information, and determine the direction of the movement of the identified customers 114 and whether the customers 114 have traveled past predefined locations corresponding to entry to and exit from the controlled area 102. In some aspects, the people counting module 132 may identify customers 114 based on bounding box information generated by the object tracking module 130 and/or faces detected by the face detection module 128. Further people counting module 132 may be configured to determine the amount of customers 114(1)-(N) that enter and exit the controlled area 102 based at least in part on machine learning models 146 configured to track customer movement.

The customer identification module 134 may be configured to recognize the customers 114(1)-(N) within the controlled area 102, and provide inference information identifying the recognized customers 114 to the analytics engine 140. In some aspects, the customer identification module 134 may be configured to identify green shoppers within the controlled area, and the presence of known red shoppers within the controlled area 102. The green shoppers may be customers 114 enrolled in a customer loyalty program or having another type of pre-existing relationship with the an operator of the analytics platform 118. Red shoppers may be customers previously-identified as having participated in unauthorized activity (e.g., theft) within the controlled area 102 or another controlled area. In some aspects, the customer identification module 134 may be configured to recognize the customers 114(1)-(N) based at least on the machine learning models 146 and the customer information 148. For example, the customer information 148 may include biometric information (e.g., facial landmarks) that may be matched with candidate biometric information captured by the video capture devices 116(1)-(N). The customer information 156 may further include at least one of a name, address, email address, demographic attributes, shopping preferences, shopping history, membership information (e.g., a membership privileges), financial information, incident history, related customers, etc.

The customer attribute detection module 136 may be configured to determine one or more attributes of the customers 114(1)-(N) based on video feed information (e.g., the interaction video frames 126(1)-(N)) received from the video capture devices 116(1)-(N), and provide inference information describing the one or more attributes of the customers 114(1)-(N) to the analytics engine 140. For instance, the customer attribute detection module 136 may configured to determine the age, gender, emotion, sentiment, body language, emotion, and/or gaze direction of a customer 114(1) within an interaction video frame 126(1), and provide the determined attribute information to the analytics engine 140. Further, the customer attribute detection module 136 may employ machine learning and/or pattern recognition techniques to determine attributes of the customers 114(1)-(N) based on video feed information.

The storage structure tracking module 138 may be configured to monitor activity at the storage structures 106(1)-(N) within the controlled area 102 based on video feed information (e.g., the storage structure video frames 124(1)-(N)), determine one or more storage structure inferences based on the monitored activity, and provide the storage structure inferences to the analytics engine 140. In some aspects, the storage structure tracking module 138 may be configured to identify the articles 108 stored within each storage structure 106, the amount of articles 108 within each storage structure 106, and/or the available storage space of each storage structure 106 based on processing the storage structure video frames 124(1)-(N). Further, the storage structure tracking module 138 may monitor the shelf activity based at least in part on machine learning models 146 and/or computer vision techniques configured to determine the available space of the regions of a storage structure, as disclosed in co-pending patent application "Real time Tracking of Shelf Activity Supporting Dynamic Shelf Size, Configuration and Item Containment," to Gopi Subramanian et al., which is hereby incorporated by reference in its entirety.

The analytics engine 140 may be configured to receive inference information from the face detection module 128, the object tracking module 130, the people counting module 132, the customer identification module 134, the customer attribute detection module 136, and/or the storage structure tracking module 138. For example, the analytics engine 140 may receive storage structure inferences from the storage structure tracking module 138, and interaction inferences from the face detection module 128, the object tracking module 130, the people counting module 132, the customer identification module 134, and/or the customer attribute detection module 136. Additionally, the analytics engine 140 may generate analytics information 150 based at least in part on the inference information. Further, the analytics engine 140 may trigger an event notification 152(1) corresponding to the analytics information 150. In some instances, the event notifications 152(1)-(N) may be a visual notification, audible notification, or electronic communication (e.g., text message, email, etc.) to the employee devices 110(1)-(N). In some aspects, the event notification 152 may be a loss prevention alert indicating possible unauthorized activity at the location associated with a storage structure 106.

Further, in some aspects, the analytics engine 140 may associate one or more storage structure inferences corresponding to a storage structure 106 with one or more interaction inferences related to the storage structure 106, and employ the associated storage structure inferences and interaction inferences to generate the analytics information 150. For instance, the analytics engine 140 may identify a time period and/or location associated with a storage structure inference. In some cases, the analytics engine 140 may identify a time period and/or location associated with a storage structure inference based on the time of capture of a storage structure video frame 124 used to determine the storage structure inference and a location or view of the video capture device 116 used to capture the storage structure video frame 124 used to determine the storage structure inference. Further, the analytics engine 140 may identify an interaction inference corresponding to the same time period and/or location. In some cases, the analytics engine 140 may identify a time period and/or location associated with an interaction inference based on the time of capture of the interaction video frame 126 used to determine the interaction inference and a location or view of the video capture device 116 used to capture the interaction video frame 126 used to determine the interaction inference. Further, the analytics engine 140 may generate the analytics information 150 based on the storage structure inference and/or the interaction inference. In addition, the analytics information 150 may be shared with analytics platforms at other controlled areas.

In some examples, the analytics engine 140 may generate prescriptive analytics information identifying a storage structure 106 that may need to be restocked, an occurrence of anomalous activity (e.g., a sweep) potentially correlating to unauthorized activity (e.g., theft) at a storage structure 106, a new position or perspective for a video capture device 116, and/or a customer 116 in need of assistance and the location of the customer 116 within the controlled area 102. In some other examples, the analytics engine 140 may generate predictive analytics information recommending restocking of a storage structure 106, a schedule for restocking a storage structure 106, an amount of employees 112 to staff at a storage structure 106, an amount of employees 112 to staff in a particular zone, an article 108(2) to store at the storage structure 106(1), a reconfiguration of the storage structure 106(1), assignment of a theft-prevention employee 112(1) at a storage structure 106, assignment of a theft-prevention employee 112(1) in a particular zone 104, assignment of employees 112 to a particular storage structure 106, an increase or decrease in the amount of articles 108 periodically ordered from a supplier, a schedule for implementing a valued customer program, and/or a location for implementing a valued customer program. As another example, the analytics engine 140 may generate predictive analytics information estimating future customer traffic within the controlled area 102, and/or future traffic flow through the controlled area 102. In yet still some other examples, the analytics engine 140 may generate performance analytics information describing key performance indicators (KPIs) of the controlled area 102 and other performance related information (e.g., employee performance based on customer sentiment and customer engagement). Some examples of KPIs include sales, revenue, traffic, labor, conversion (i.e., total sales/total traffic), sales per shopper (SPS), average transaction size (ATS), etc. Further, the KPIs may be used to determine prescriptive analytics information and/or the predictive analytics information. For example, the traffic may be used to determine recommended schedule and zone assignments for the employees 112(1)-(N).

As an example, the analytics engine 140 may receive a storage structure inference indicating that 100% of the available capacity of a region of a storage structure 106(1) is currently being used (i.e., no articles 108 have been removed from the storage structure 106(1)). Further, the analytics engine 140 may receive a plurality of interaction inferences indicating that a plurality of women gazed at the articles 108 of the storage structure 106(1) and were sad while gazing at the articles 108 stored within region based on sentiment analysis. Consequently, the analytics engine 140 may recommend moving the articles 108 to a storage structure 106(2) having a lesser value or reducing the price of the articles 108.

As another example, the analytics engine 140 may receive an interaction inference that identifies that a customer 114(1) is exhibiting body language indicative of a need for assistance (e.g., raising a hand for a threshold amount of time, waving a hand within a view of a camera, etc.). Consequently, the analytics engine 140 may send an alert to an employee 112(1) having customer service responsibilities for the location (e.g., the zone 104(1)) via an employee device 110(1), and recommend that the employee 112(1) relocate to the location of the customer 114. Additionally, or alternatively, the analytics engine 140 may trigger an audio notification, a visual notification, and/or a digital experience at the location of the customer 114(1). For instance, the analytics engine 140 may trigger presentation of an anticipated wait time on a visual display (e.g., a smart speaker) at the location of the customer 114, an audio reproduction indicating the anticipated wait time via an audio device (e.g., a smart speaker), and/or initialize an audio or text chatbot configured to answer customer questions (e.g., product location queries) and provide contextual recommendations. In some aspects, the analytics engine 140 may further receive a storage structure inference indicating that the amount of articles 108 at the storage structure 106(1) closest to the customer 114(1) in need of assistance is below a threshold amount. Consequently, the analytics engine 140 may send an alert to the employee 112(1) indicating that the customer 114(1) may request one or more articles 108 currently displayed at the storage structure 106(1).

As another example, the analytics engine 140 may receive a storage structure inference indicating that a sweep (e.g., removal of anomalous amount of articles 108 over a period of time) may have occurred based at least in part on the number of articles 108 within the storage structure 106(1) and/or the available storage space of the storage structure 106(1). Further, the analytics engine 140 may receive an interaction inference that identifies the presence of a red shopper at the storage structure 106(1) during the same period of time the sweep occurs. Consequently, the analytics engine 140 may alert an employee 112 having theft prevention responsibilities, and recommend the employee 112 go to the storage structure 106(1).

As yet still another example, the analytics engine 140 may receive a storage structure inference indicating that the amount of items displayed in a region of a storage structure 106(1) decreased by 80% during a first period of time. Further, the analytics engine 140 may receive a plurality of interaction inferences identifying interactions between the employee 112(1) and a plurality of customers 114 with positive sentiment at the same time in the vicinity of the storage structure 106(1). Consequently, the analytics engine 140 may identify that the employee 112(1) does well assisting customer 114 with respect to the articles 108 currently stored in the storage structure 106(1).

In yet still another example, the analytics engine 140 may receive a plurality of storage structure inferences indicating that a sweep may have occurred at the same time of day on different days. Further, the analytics engine 140 may receive a plurality of interaction inferences indicating the presence of red shoppers within the controlled area 102 at the same time. Consequently, the analytics engine 140 may recommend increasing the amount of employees having theft prevention responsibilities staffed during the time of day associated with the storage structure inferences and interaction inferences. Further, the controlled area 102 may be a retail store, and the analytics platform 118 may distribute the recommendation to other related retail locations for loss prevention purposes.

Further, in some aspects, the inference information may be represented in a graph data structure. For example, the nodes of the graph may correspond to inferences determined by the storage structure tracking module 138, the face detection module 128, the object tracking module 130, the people counting module 132, the customer identification module 134, and/or the customer attribute detection module 136. In addition, the analytics engine 140 may employ graph operations to determine the analytics information 150. For example, the analytics engine 140 may determine performance analytics information, prescriptive analytics information, and/or predictive analytics information based upon the distance between nodes within the graph data structure. In another example, the analytics engine 140 may determine performance analytics information, prescriptive analytics information, and/or predictive analytics information based upon the number of edges associated with a node of the graph.

In addition, the presentation module 144 may generate graphical user interfaces displaying the storage structure inferences, the interaction inferences, the analytics information 150 and the video feed captured by the video capture devices 116(1)-(N). For example, the presentation module 144 may display graphs and tables describing the storage structure inferences, the interaction inferences, and the analytics information 150 within a GUI. Further, the presentation module 144 may display the event notifications 152(1)-(N). For example, the presentation module 144 may display the performance analytics information, the prescriptive analytics information, and/or the predictive analytics information determined by the analytics engine 140 within a GUI. Further, the presentation module 144 may display the storage structure video frames 124(1)-(N) and the interaction video frames 126(1)-(N) with the inference information or analytics information 150. For example, the presentation module 144 may display the interaction video frames 126(1)-(N) with bounding boxes indicating whether a customer is being engaged.

Figure 2A:
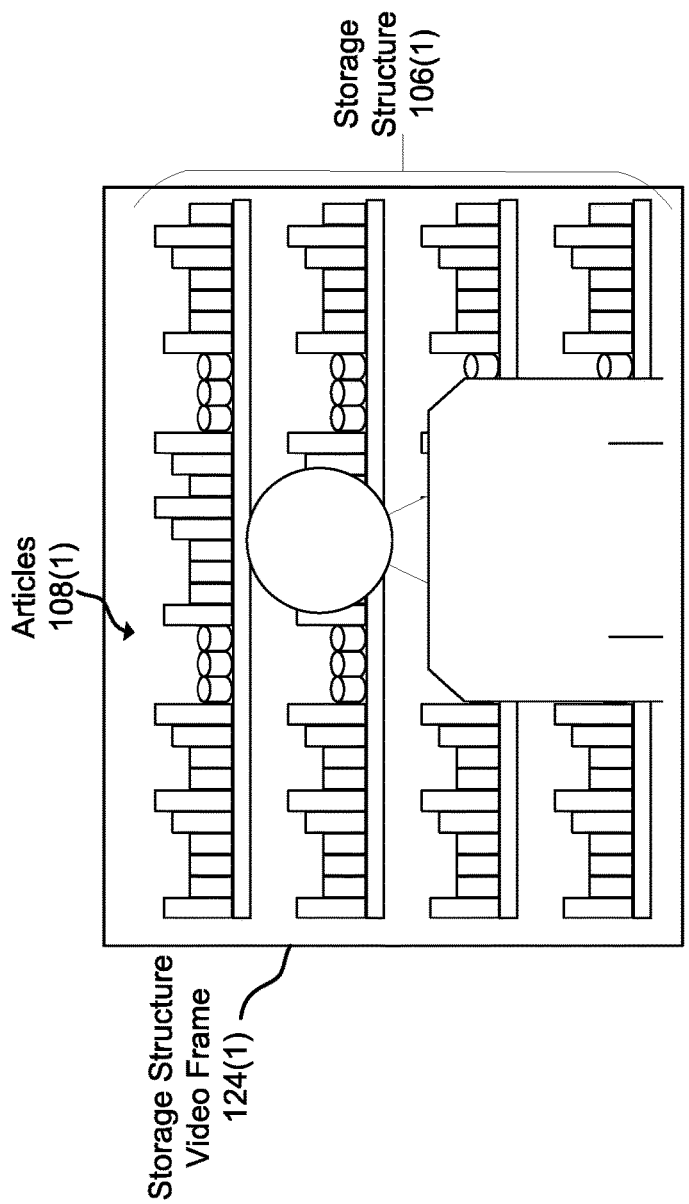
FIG. 2A is an example of a storage structure video frame, according to some implementations.
Figure 2B:
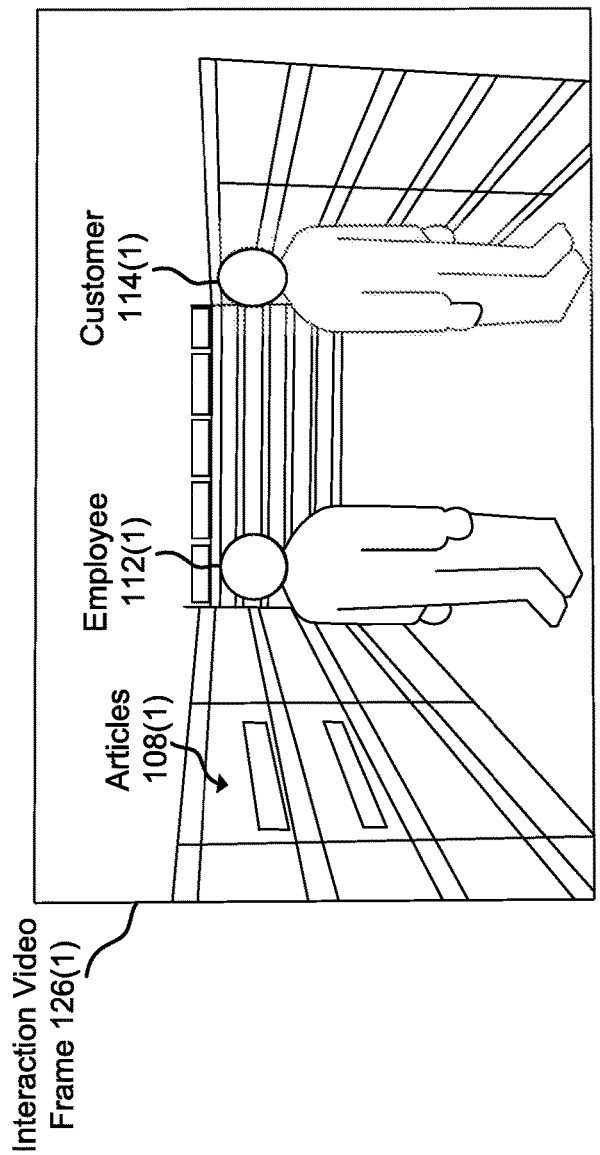
FIG. 2B is an example of an interaction video frame, according to some implementations.

FIG. 2A is an example of a storage structure video frame 200, according to some implementations. As illustrated in FIG. 2A, a storage structure video frame 200 (e.g., the storage structure video frames 124(1)-(N)) may capture a view of the articles 108 on the storage structure 106(1) from a perspective focused on the storage structure 106(1) (e.g., a point of view or first-person view facing the storage structure). FIG. 2B is an example of an interaction video frame, according to some implementations. As illustrated in FIG. 2B, an interaction video frame 202 (e.g., the interaction video frames 126(1)-(N)) may capture a view of the interaction between the customers 114 and the storage structure 106(1) from a perspective capturing the storage structure 106(1) and the employees 112 or customers 114 in the vicinity of the storage structure 106(1).

Figure 3A:
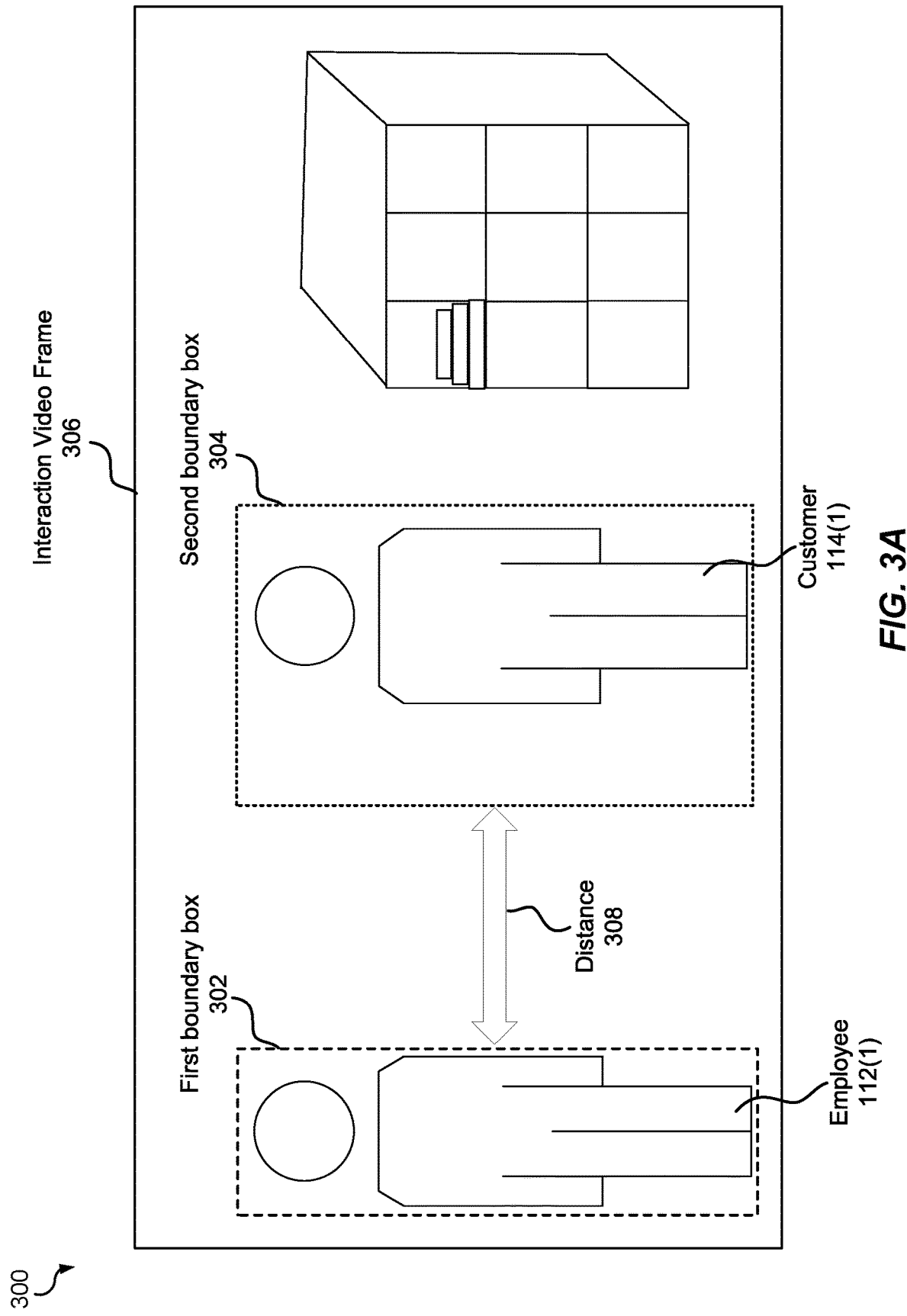
FIG. 3A is an example of unengaged bounding boxes, according to some implementations.

FIG. 3A is an example 300 of unengaged bounding boxes, according to some implementations. As described in detail herein, the analytics platform 118 may generate a first bounding box 302 corresponding to the employee 112(1) and a second bounding box 304 corresponding to the customer 114(1) within an interaction frame 306 (e.g., an interaction frame 126(1)-(N)). In addition, in some aspects, the object tracking module 130 may determine that the customer 114(1) is not being assisted by the employee 112(1) based at least in part on the distance 308 being greater than a threshold distance. Further, the object tracking module 130 may maintain a wait timer tracking the amount of the time the customer 114(1) is waiting to be assisted by one of the employees 112(1)-(N). In addition, the object tracking module 130 may provide the wait timer result to the analytics engine 140.

Figure 3B:
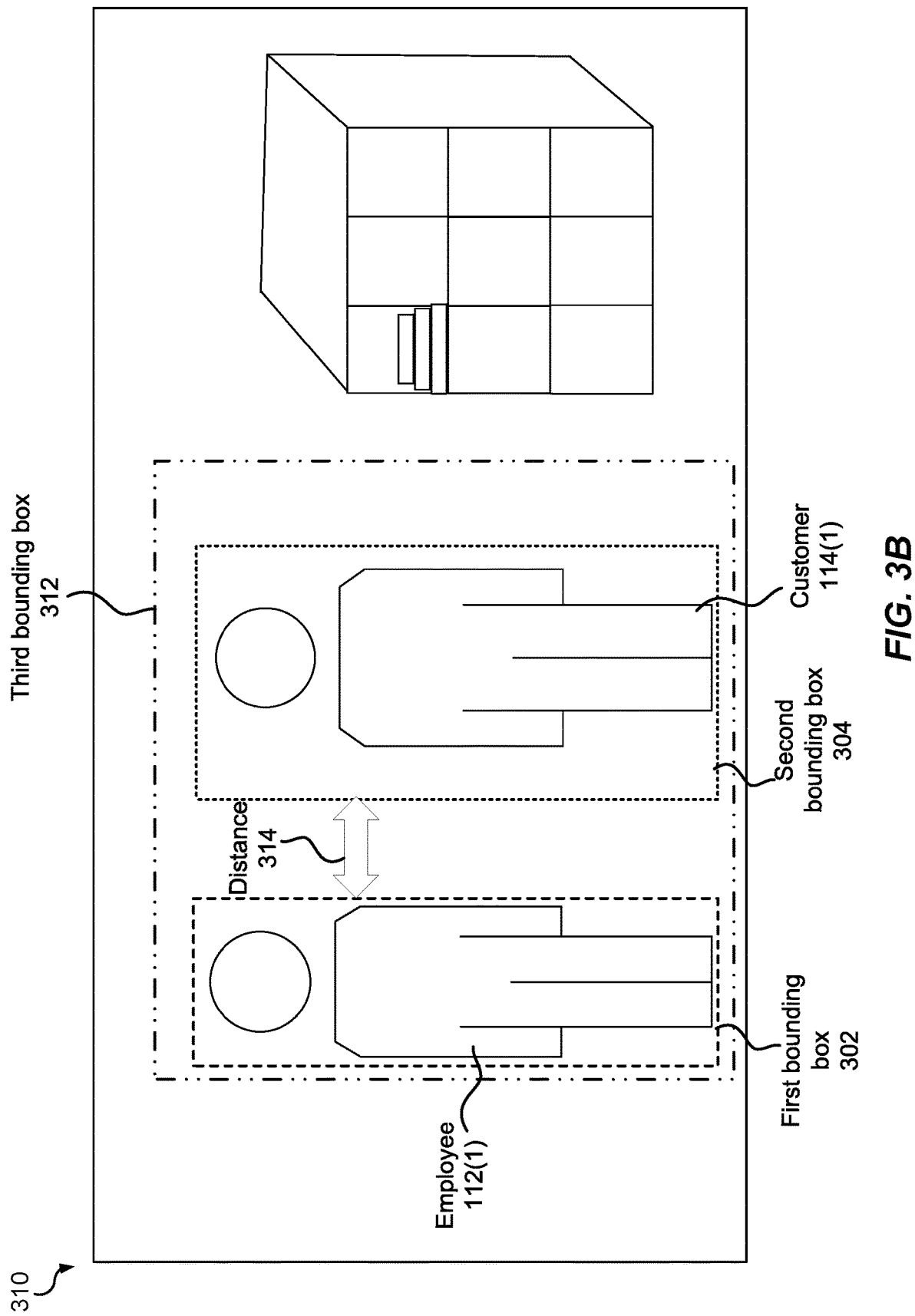
FIG. 3B is an example of engaged bounding boxes, according to some implementations.

FIG. 3B is an example 310 of engaged bounding boxes, according to some implementations. As described in detail herein, the analytics platform 118 may determine that the employee 112(1) is interacting with the customer 114(1), and generate a third bounding box 312 encompassing the first bounding box 302 and the second bounding box 304. In some aspects, the analytics platform 118 may determine that the employee 112(1) is interacting with the customer 114(1) based at least in part on the distance 314 between employee 112(1) and the customer 114(1) being less than a threshold distance. Further, the object tracking module 130 may maintain an engaged timer tracking the amount of time the customer 114(1) is interacting with the employee 112(1). In addition, the object tracking module 130 may provide the engaged timer result to the analytics engine 140. In some examples, the presentation module 144 may present a video feed displaying the boundary boxes, wait timer, and engagement timer. In some aspects, the presentation module 144 may update the displayed bounding boxes in each frame of the video feed. Further, the presentation module 144 may apply graphical effects to the bounding boxes to assist a viewer in distinguishing between a customer 114 and employee 112, and a customer 114 that is waiting for assistance and a customer 114 that is being assisted by an employee 112.

Figure 4:
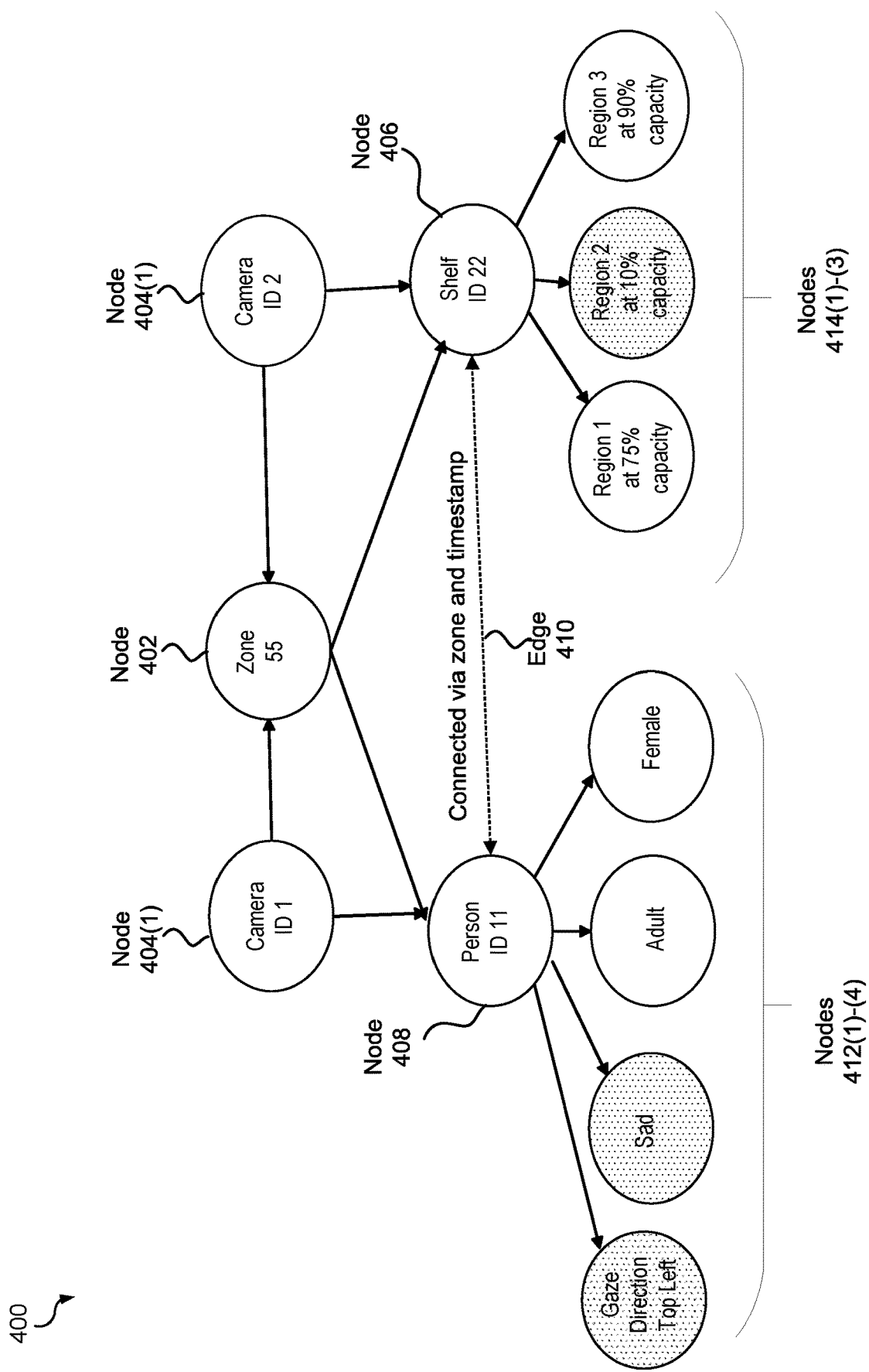
FIG. 4 is a knowledge graph diagram of inference information, according to some implementations.

FIG. 4 is a knowledge graph diagram 400 of inference information, according to some implementations. As described herein, the analytics engine 140 may build a knowledge graph diagram 400 including the analytics information 150. As illustrated in FIG. 4, the knowledge graph may include node 402 corresponding to a zone 104(1) within the controlled area 102.

Further, the knowledge graph diagram 400 may include a node 404(1) corresponding to the video capture device 116(1) configured to provide storage structure video frames 124 within the zone 104(1) and a node 404(2) corresponding to a video capture device 116(2) for providing interaction video frames 126 within the for providing interaction video frames 126. Further, the knowledge graph diagram 400 may include a node 406 corresponding to a customer 114(1) within the zone 104(1), and a node 408 corresponding to storage structure 106(1) within the zone 104(1). In addition, the video capture device 116(1) associated with the node 404(1) may be positioned to capture shelf activity at the storage structure 106(1) represented by the node 408.

As illustrated in FIG. 4, the knowledge graph diagram 400 may include an edge 410 indicating that the nodes 406 and 408 correspond to the same zone 104(1) and period of time. For example, the edge 410 may indicate that a time stamp corresponding to an interaction video frame 126(1) capturing the customer 114(1) in the zone 104(1) is equal to the time stamp corresponding to the storage structure video frame 124(1) capturing activity at the storage structure 106(1). Further, the knowledge graph diagram 400 may include nodes 412(1)-(4) corresponding to inference information determined from the interaction video frame 126(1), and nodes 414(1)-(3) corresponding to inference information determined from the storage structure video frame 124(1).

As described in detail herein, the analytics engine 140 may employ the knowledge graph diagram 400 to determine analytics information 150. In some aspects, employing a graph representation permits inference information from different contexts to be used together to generate the analytics information 150. As such, the present invention may leverage inference information from different contexts to enhance the customer experience, optimize storage structure usage, and/or maximize profits within the controlled area 102.

Figure 5:
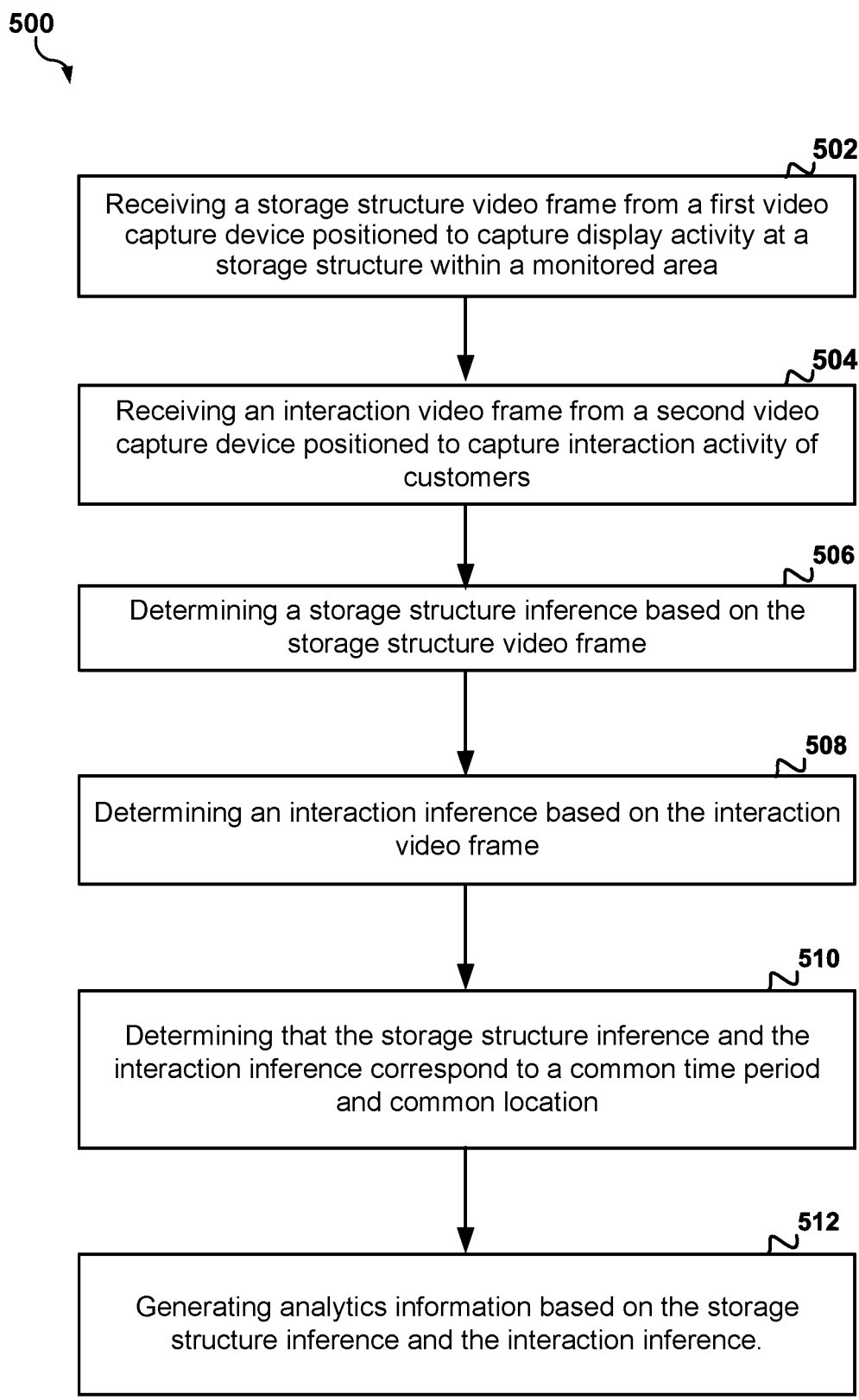
FIG. 5 is a flow diagram of an example of a method of implementing a system for generating real-time interior analytics using ML and computer vision, according to some implementations.

Referring to FIG. 5, in operation, the analytics platform 118 or computing device 600 may perform an example method 500 for generating real-time interior analytics using ML and computer vision. The method 500 may be performed by one or more components of the analytics engine 140, the computing device 600, or any device/component described herein according to the techniques described with reference to FIG. 1.

At block 502, the method 500 includes receiving a storage structure video frame from a first video capture device positioned to capture display activity at a storage structure within a monitored area. For example, the analytics platform 118 may receive the storage structure video frame 124(1) from a first video capture device 116(1) within the controlled area 102. Further, the storage structure video frame 124(1) may capture addition of articles 108 to the storage structure 106(1) and removal of articles 108 from the storage structure 106(1) based on the position of the video capture device 116(1).

At block 504, the method 500 includes receiving an interaction video frame from a second video capture device positioned to capture interaction activity of customers. For example, the analytics platform 118 may receive the interaction video frame 126(1) from a second video capture device 116(2) within the controlled area 102. Further, the interaction video frame 126(1) may capture customer interaction in the vicinity of the storage structure 106(2) based on the position of the video capture device 116(1).

At block 506, the method 500 includes determining a storage structure inference based on the storage structure video frame. For example, the storage structure tracking module 138 may determine the amount of articles 108 within the storage structure 106(1), and/or the available storage space of the storage structure 106(1) based on processing the storage structure video frame 124(1).

At block 508, the method 500 includes determining an interaction inference based on the interaction video frame. For example, the face detection module 128 may identify faces within the interaction video frame 126(1). Further, the object tracking module 130 may determine path information for the employees 112(1)-(N) and customers 114(1)-(N) based on the interaction video frame 126(1), and/or determine the wait time and the engagement time of customers 114(1)-(N) based on the interaction video frame 126(1). In addition, people counting module 132 may determine the amount of customers 114(1)-(N) that enter and exit the controlled area 102 based on the interaction video frame 126(1). Additionally, the customer identification module 134 may identify the customers 114(1)-(N) within the controlled area 102 based on the interaction video frames 126(1)-(N), and the customer attribute detection module 136 may determine one or more attributes of the customers 114(1)-(N) based on the interaction video frames 126(1)-(N).

At block 510, the method 500 includes determining that the storage structure inference and the interaction inference correspond to a common time period and common location. For example, the analytics engine 140 may determine that the storage structure video frame 124(1) used to determine the storage structure inference and the interaction video frame 126(1) used to determine the interaction inference correspond to the same storage structure 106(1) and were captured within a two minute window. In some other examples, the analytics engine 140 may determine that the storage structure video frame 124(1) used to determine the storage structure inference and the interaction video frame 126(1) used to determine the interaction inference correspond to the same storage structure 106(1) and were captured at the same period of time (e.g., afternoon) on different days. In yet still some other examples, the analytics engine 140 may that the storage structure video frame 124(1) used to determine the storage structure inference and the interaction video frame 126(1) used to determine interaction inference correspond to the storage structures 106(1)-(2) in the same zone 104(1) and were captured at the same period of time (e.g., afternoon) on different days.

At block 512, the method 500 includes generating analytics information based on the storage structure inference and the interaction inference. For example, the analytics engine 140 may generate the analytics information 150 based on at least the storage structure inference and the interaction inference. In some instances, the analytics information 150 may recommend restocking the storage structure 106(1) at a future date or time, a schedule for restocking the storage structure 106(1), a particular amount of employees to staff the zone 104(1), storing the article 108(1) at the storage structure 106(1), a particular configuration of the storage structure 106(1), assignment of a theft-prevention employee at the storage structure 106(1), assignment of a theft-prevention employee in the zone 104(1), assignment of employees to the storage structure 106(1), an increase or decrease in the amount of articles 108 periodically ordered from a supplier, a schedule for implementing a valued customer program, customer traffic within the controlled area 102, traffic flow through the controlled area 102, and/or a location for implementing a valued customer program. Additionally, in some instances, the analytics information 150 may prescribe restocking the storage structure 106(1), instructing an employee to address a customer in need of assistance at the storage structure 106(1), or instructing an employee to address a potential unauthorized activity at the storage structure 106(1).

Figure 6:
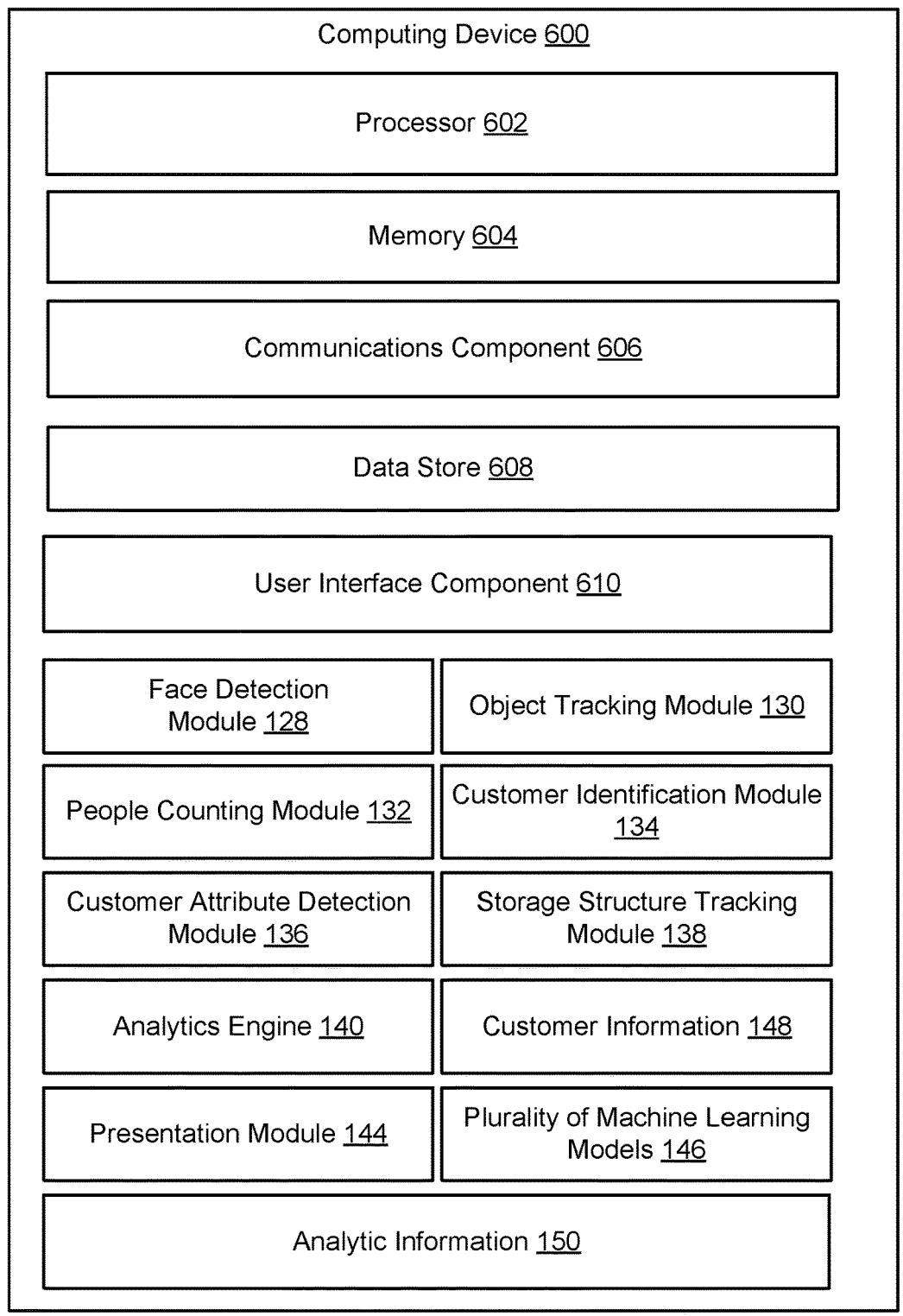
FIG. 6 is block diagram of an example of a computer device configured to implement a system for generating and presenting real-time interior analytics using ML and computer vision, according to some implementations.

Referring to FIG. 6, a computing device 600 may implement all or a portion of the functionality described herein. The computing device 600 may be or may include or may be configured to implement the functionality of at least a portion of the system 100, or any component therein. For example, the computing device 600 may be or may include or may be configured to implement the functionality of the plurality of employee devices 110(1)-(N), the video capture devices 116(1)-(N), the analytics platform 118, or the other sensors and systems 120. The computing device 600 includes a processor 602 which may be configured to execute or implement software, hardware, and/or firmware modules that perform any functionality described herein.

For example, the processor 602 may be configured to execute or implement software, hardware, and/or firmware modules that perform any functionality described herein with reference to the face detection module 128, the object tracking module 130, the people counting module 132, the customer identification module 134, the customer attribute detection module 136, and the storage structure tracking module 138, the analytics engine 140, or any other component/system/device described herein.

The processor 602 may be a micro-controller, an application-specific integrated circuit (ASIC), a digital signal processor (DSP), or a field-programmable gate array (FPGA), and/or may include a single or multiple set of processors or multi-core processors. Moreover, the processor 602 may be implemented as an integrated processing system and/or a distributed processing system. The computing device 600 may further include a memory 604, such as for storing local versions of applications being executed by the processor 602, related instructions, parameters, etc. The memory 604 may include a type of memory usable by a computer, such as random access memory (RAM), read only memory (ROM), tapes, magnetic discs, optical discs, volatile memory, non-volatile memory, and any combination thereof. Additionally, the processor 602 and the memory 604 may include and execute an operating system executing on the processor 602, one or more applications, display drivers, etc., and/or other components of the computing device 600.

Further, the computing device 600 may include a communications component 606 that provides for establishing and maintaining communications with one or more other devices, parties, entities, etc. utilizing hardware, software, and services. The communications component 606 may carry communications between components on the computing device 600, as well as between the computing device 600 and external devices, such as devices located across a communications network and/or devices serially or locally connected to the computing device 600. In an aspect, for example, the communications component 606 may include one or more buses, and may further include transmit chain components and receive chain components associated with a wireless or wired transmitter and receiver, respectively, operable for interfacing with external devices.

Additionally, the computing device 600 may include a data store 608, which can be any suitable combination of hardware and/or software, that provides for mass storage of information, databases, and programs. For example, the data store 608 may be or may include a data repository for applications and/or related parameters not currently being executed by processor 602. In addition, the data store 608 may be a data repository for an operating system, application, display driver, etc., executing on the processor 602, and/or one or more other components of the computing device 600.

The computing device 600 may also include a user interface component 610 operable to receive inputs from a user of the computing device 600 and further operable to generate outputs for presentation to the user (e.g., via a display interface to a display device). The user interface component 610 may include one or more input devices, including but not limited to a keyboard, a number pad, a mouse, a touch-sensitive display, a navigation key, a function key, a microphone, a voice recognition component, or any other mechanism capable of receiving an input from a user, or any combination thereof. Further, the user interface component 610 may include one or more output devices, including but not limited to a display interface, a speaker, a haptic feedback mechanism, a printer, any other mechanism capable of presenting an output to a user, or any combination thereof.

Further, while the figures illustrate the components and data of the analytics platform 118 as being present in a single location, these components and data may alternatively be distributed across different computing devices and different locations in any manner. Consequently, the functions may be implemented by one or more service computing devices, with the various functionality described herein distributed in various ways across the different computing devices 600. Multiple computing devices 600 may be located together or separately, and organized, for example, as virtual servers, server banks and/or server farms. The described functionality may be provided by the servers of a single entity or enterprise, or may be provided by the servers and/or services of multiple different buyers or enterprises.

What is claimed is:

1. A method comprising:
   receiving a storage structure video frame from a first video capture device positioned to capture display activity at a storage structure within a monitored area;
   receiving an interaction video frame from a second video capture device positioned to capture interaction activity of customers;
   determining a storage structure inference based on the storage structure video frame;
   determining an interaction inference based on the interaction video frame;
   associating the storage structure inference and the interaction inference based on determining that the storage structure inference and the interaction inference correspond to a common time period and common location; and
   triggering an event based on associating the storage structure inference and the interaction inference.

2. The method of claim 1, further comprising:
   identifying an employee associated with the storage structure, wherein triggering the event includes sending a notification to an employee device associated with the employee, the notification including an instruction.

3. The method of claim 1, further comprising:
   identifying a third video capture device associated with the storage structure, wherein triggering the event includes sending a notification to the third video capture device, the notification instructing the third video capture device to reposition to capture a potential event at the storage structure.

4. The method of claim 1, wherein determining the storage structure inference, comprises determining an available capacity of a portion of the storage structure.

5. The method of claim 1, wherein determining the storage structure inference, comprises identifying a sweep event or a restocking requirement at the storage structure.

6. The method of claim 1, wherein determining the interaction inference, comprises determining at least one of a wait time or an engagement time of a customer in a zone of the monitored area.

7. The method of claim 1, wherein determining the interaction inference, comprises determining a sentiment of a customer in a zone of the monitored area.

8. The method of claim 1, wherein determining the interaction inference, comprises determining a demographic attribute of a customer in a zone of the monitored area.

9. The method of claim 1, wherein triggering the event comprises:

sending an employee assignment recommendation recommending a type of employee staff a location associated with the storage structure;

sending a loss prevention alert indicating possible unauthorized activity at the location associated with the storage structure;

sending a report including one or more key performance indicators associated with activity within the monitored area; or sending a schedule for stocking the storage structure.

10. A non-transitory computer-readable device having instructions thereon that, when executed by at least one computing device, causes the at least one computing device to perform operations comprising:

receiving a storage structure video frame from a first video capture device positioned to capture display activity at a storage structure within a monitored area;

receiving an interaction video frame from a second video capture device positioned to capture interaction activity of customers;

determining a storage structure inference based on the storage structure video frame;

determining an interaction inference based on the interaction video frame;

associating the storage structure inference and the interaction inference based on determining that the storage structure inference and the interaction inference correspond to a common time period and common location; and triggering an event based on associating the storage structure inference and the interaction inference.

11. The non-transitory computer-readable device of claim 10, the operations further comprising:

identifying an employee associated with the storage structure, wherein triggering the event includes sending a notification to an employee device associated with the employee, the notification including an instruction.

12. The non-transitory computer-readable device of claim 10, the operations further comprising:

identifying a third video capture device associated with the storage structure, wherein triggering the event includes sending a notification to the third video capture device, the notification instructing the third video capture device to reposition to capture a potential event at the storage structure.

13. The non-transitory computer-readable device of claim 10, wherein determining the storage structure inference, comprises determining an available capacity of a portion of the storage structure.

14. The non-transitory computer-readable device of claim 10, wherein determining the interaction inference, comprises determining at least one of a wait time or an engagement time of a customer in a zone of the monitored area.

15. The non-transitory computer-readable device of claim 10, wherein triggering the event comprises:

sending an employee assignment recommendation recommending a type of employee staff a location associated with the storage structure;

sending a loss prevention alert indicating possible unauthorized activity at the location associated with the storage structure;

sending a report including one or more key performance indicators associated with activity within the monitored area; or sending a schedule for stocking the storage structure.

16. A system comprising:

a memory; and at least one processor coupled to the memory and configured to:

receive a storage structure video frame from at least one video capture device, the storage structure video frame capturing display activity at a storage structure within a monitored area;

receive an interaction video frame from the at least one video capture device, the interaction video frame capturing interaction activity of customers;

determine a storage structure inference based on the storage structure video frame;

determine an interaction inference based on the interaction video frame;

associate the storage structure inference and the interaction inference based on determining that the storage structure inference and the interaction inference correspond to a related time period and a related location; and trigger an event based on associating the storage structure inference and the interaction inference.

17. The system of claim 16, wherein to determine the storage structure inference, the at least one processor is configured to determine an available capacity of a portion of the storage structure.

18. The system of claim 16, wherein to determine the storage structure inference, the at least one processor is configured to identify a sweep event or a restocking requirement at the storage structure.

19. The system of claim 16, wherein to determine the interaction inference, the at least one processor is configured to determine at least one of a wait time or an engagement time of a customer in a zone of the monitored area.

20. The system of claim 16, wherein to trigger the event, the at least one processor is configured:

send an employee assignment recommendation recommending a type of employee staff a location associated with the storage structure;

send a loss prevention alert indicating possible unauthorized activity at the location associated with the storage structure;

send a report including one or more key performance indicators associated with activity within the monitored area; or send a schedule for stocking the storage structure to determine at least one of a wait time or an engagement time of a customer in a zone of the monitored area.

21. The system of claim 16, wherein to determine the interaction inference based on the interaction video frame, the at least one processor is further configured:

determine that a customer is requesting assistance based at least in part on body language detected within the interaction video frame.

22. The system of claim 16, wherein to trigger the event, the at least one processor is further configured:

trigger presentation of an anticipated wait time on a visual display at the storage structure;

trigger an audio reproduction indicating the anticipated wait time at the storage structure; or initialize an audio or text chatbot conversation with a customer at the storage structure.

* * * * *